June 22, 1937.　　　　H. J. COUTURE　　　　2,084,946
LAWN MOWER
Filed Sept. 16, 1935
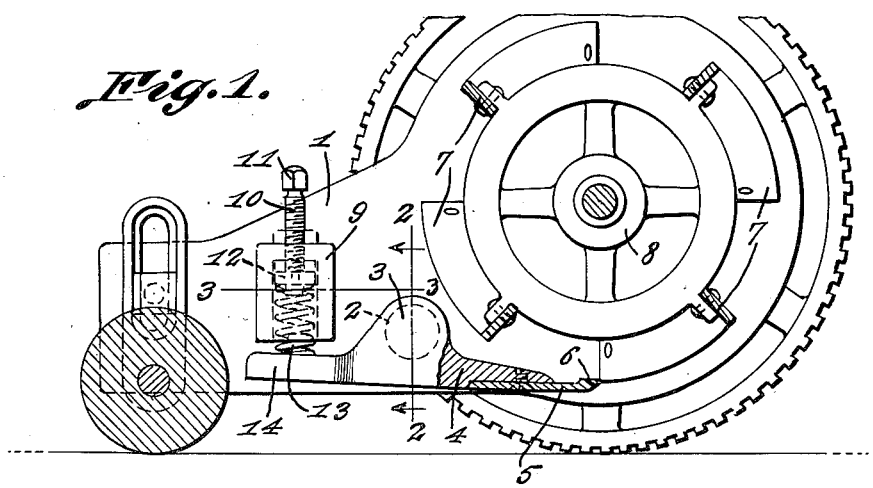
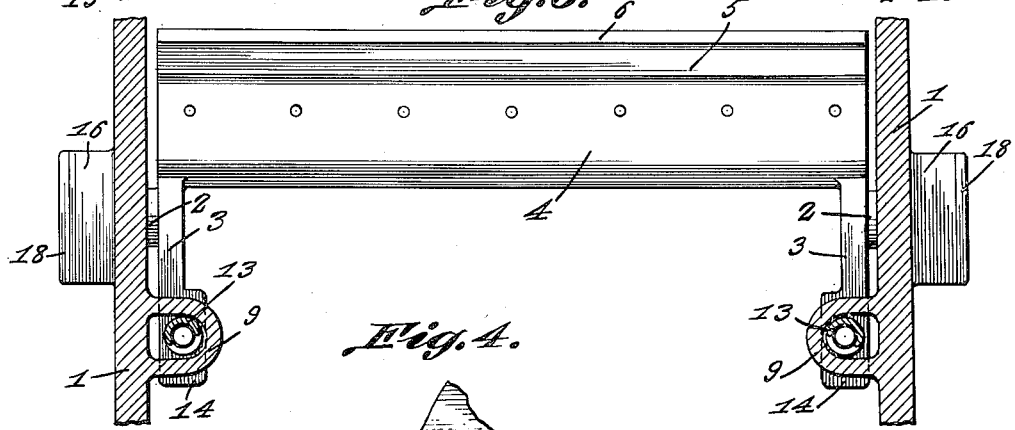
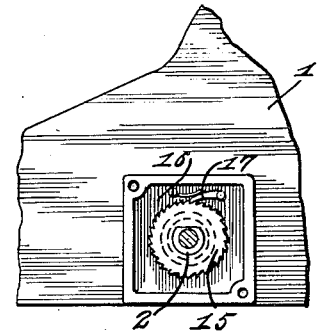
Herman J. Couture, INVENTOR
BY Victor J. Evans & Co.
ATTORNEY Patented June 22, 1937

2,084,946

UNITED STATES PATENT OFFICE 2,084,946

LAWN MOWER

Herman J. Couture, Watertown, Mass.

Application September 16, 1935, Serial No. 40,856

2 Claims. (Cl. 56—294)

This invention relates to lawn mowers, and its general object is to provide a rockably mounted cutter bar therefore, that is adjusted automatically with respect to the blades of the cutter reel, to compensate for wear and to assure efficient operation and cutting action of the mower under all working conditions.

A further object of the invention is to provide an automatically adjusted cutter bar for a lawn mower that is simple in construction, easy to install, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a vertical sectional view taken through a lawn mower and illustrating my cutter bar and the adjusting means therefor in applied position.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a detail view illustrating the ratchet means to prevent movement of the cutter bar away from the cutter reel.

Referring to the drawing in detail, the reference numeral 1 indicates the side plates of the frame of a lawn mower which may be of the hand pushed or motor driven type. In any event, the side plates are provided with openings to receive trunnions 2 that are formed on and extend outwardly from rearwardly directed projections 3 formed on the body 4 of the cutter bar, with the result it will be seen that the cutter bar is mounted for rocking movement in the side plates of the frame, but is held against movement away from the cutter reel by suitable means which will be presently described.

The body 4 is provided with a groove on the underside of a forwardly projecting portion and mounted in the groove is a cutting blade 5 which is held therein by screws or like securing means as best shown in Figure 1. The blade has a longitudinally extending upwardly projecting forward end 6 arranged for cooperation with the blades 7 of the cutting reel 8.

Formed with the inner side of the plates 1 and arranged in parallelism with respect to each other are boxes 9 having open lower ends and closed upper ends, the latter having threaded openings therein to accommodate the threaded shanks 10 of set screw members 11 which have square cornered heads thereon and follower blocks 12 mounted within the boxes to provide abutment means for the upper convolutions of coil springs 13, while the lower convolutions contact the enlarged rear ends 14 of the rearwardly directed projections 3, as clearly shown in Figures 1 and 3.

The enlarged rear ends have studs formed thereon and rising therefrom for disposal within the springs for holding the latter against casual displacement.

The trunnions 2 have reduced outer ends flattened to provide key-ways for ratchet wheels 15, and the reduced outer ends are disposed on the outer sides of the plates 1, but within receptacles 16 that provide chambers for the ratchet means. The extreme outer ends of the trunnions 2 are threaded to receive nuts for securing the ratchet wheels in fixed position, as well as holding the cutter bar mounted on the side plates.

Cooperating with the ratchet wheels 15 are spring pressed pawls 17 that prevent forward movement of the ratchet wheels and consequently movement of the cutter bar blade out of the path of or away from the blades of the cutter reel, and due to that structure coupled with the action of the coil springs 13, it will be obvious that the blade of the cutter bar is held in proper relation with respect to the blades of the cutter reel, and in constant floating contact therewith under all working conditions. It will be further obvious that the adjustment of the cutter bar is automatic, and the pressure of the springs 13 can be regulated through the instrumentality of the set screws 11.

The receptacles 16 are provided with covers 18 that are held thereon through the instrumentality of screws or the like, as best shown in Figure 2, therefore it will be seen that the ratchet mechanism is retained free from dirt, dust and foreign matter, that may interfere with the efficient operation thereof.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. In a lawn mower, a frame including side plates, a cutting reel provided with blades and rotatably mounted in the side plates, a cutter bar including a body, a blade secured to the body and for disposal in the path of the first blades, projections secured to and extending rearwardly from the body, trunnions secured to and extending laterally from the projections and journaled in the side plates for rockably mounting the cutter bar with respect thereto, spring means mounted on the side plates and engageable with the projections rearwardly of the trunnions, adjustable means for the spring means and acting to compress the same to vary the tension thereof and to urge the blade of the cutter bar in the path of the cutting reel blades for wiping engagement thereby, pawl and ratchet means mounted on the side plates and trunnions respectively, and said pawl and ratchet means cooperating with the spring means to hold the cutter bar blade in constant floating contact with the cutting reel blades and to automatically adjust the cutter bar blade accordingly.

2. In a lawn mower, a frame including side plates, a cutting reel provided with blades and rotatably mounted in the side plates, a cutter bar including a body, a blade secured to the body and for disposal in the path of the first blades, projections secured to and extending rearwardly from the body, trunnions secured to and extending laterally from the projections and journaled in the side plates for rockably mounting the cutter bar with respect thereto, housing means mounted on the side plates, coil springs within the housing means and engageable with the projections rearwardly of the trunnions, adjustable means engaging the coil springs and acting to compress the latter to vary the tension thereof and to urge the blade of the cutter bar in the path of the cutting reel blades for wiping engagement thereby, a ratchet wheel for each trunnion and fixed thereto, a pawl for each ratchet wheel to prevent movement thereof in one direction, and cooperating with the coil spring to hold the cutter bar in constant floating contact with the cutting reel blades and to automatically adjust the cutter bar blade accordingly.

HERMAN J. COUTURE.